United States Patent [19]

Vis

[11] 4,345,380
[45] Aug. 24, 1982

[54] GAP GAUGE

[75] Inventor: Arthur D. Vis, Warren, Mich.

[73] Assignee: Candid Logic, Inc., Hazel Park, Mich.

[21] Appl. No.: 241,196

[22] Filed: Mar. 6, 1981

[51] Int. Cl.³ ................................................ G01B 7/02
[52] U.S. Cl. ................................................ 33/147 N
[58] Field of Search ............. 33/147 R, 147 K, 147 L, 33/147 F, 147 N, 148 R, 148 H, 143 R, 143 M, 149 J, 178 R, 178 E

[56] References Cited

U.S. PATENT DOCUMENTS

| | | | |
|---|---|---|---|
| 1,243,545 | 10/1917 | Nefedov | 33/147 R |
| 2,331,757 | 10/1943 | Anders | 33/147 F |
| 2,824,376 | 2/1958 | Yarrow | 33/147 N |

Primary Examiner—Harry N. Haroian
Attorney, Agent, or Firm—Krass, Young & Schivley

[57] ABSTRACT

A hand-held, manually operable gauge for measuring the gap between opposing surfaces of a pair of spaced parts includes a pair of reciprocable gauge fingers insertable into the gap and respectively shiftable into engagement with the parts by a lever pivotally mounted on a handle. One of the fingers is stationarily mounted on the handle while the other finger is secured to a plunger slidably mounted on the handle and driven by the lever. Linear displacement of the plunger is translated by a rack and pinion to rotary motion for operating a potentiometer whose setting corresponds to the magnitude of the gap. A switch carried by the handle and activated by the lever produces a signal proportional to the potentiometer setting, which signal is delivered to a device for visually displaying the magnitude of the gap. A lost motion mechanism permits continued displacement of the lever after the gauge fingers have contacted the parts.

16 Claims, 5 Drawing Figures

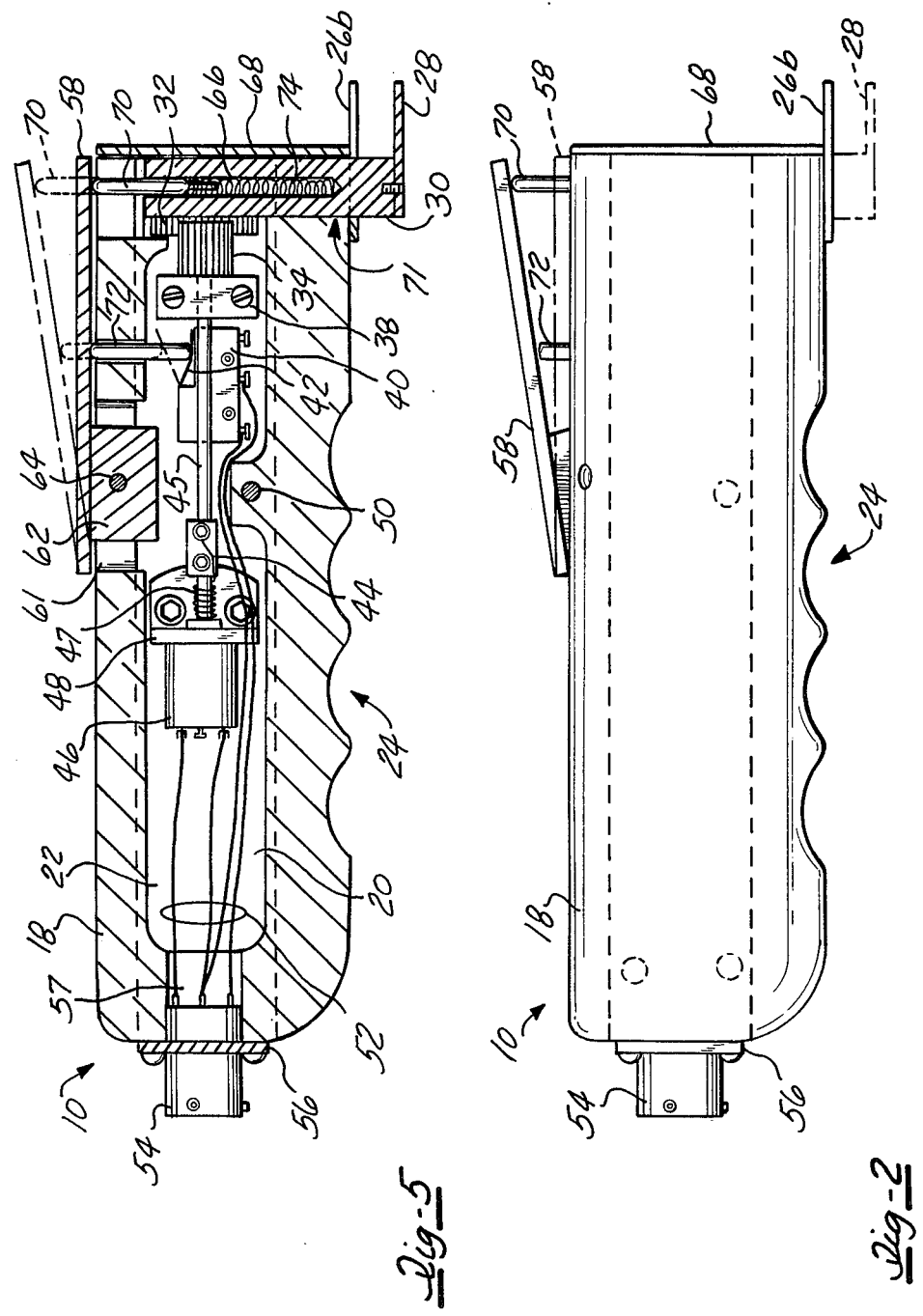

GAP GAUGE

TECHNICAL FIELD

The present invention generally relates to a gauge for measuring a gap between opposing parts, and deals more particularly with a manually operable, hand-held gauge provided with a pair of gauge fingers for contacting opposing surface areas of the parts.

BACKGROUND ART

In manufacturing quality control, it is often necessary to measure the width of a gap between two adjacent, opposing surface areas. For example, the gap between a door panel and an adjoining body panel on an automobile inherently vary from unit to unit in mass production operations. Engineering standards set minimum and maximum gap widths based on both functional and aesthetic considerations. For example, if the gap is too small between a door and body panel, interference therebetween is likely to occur after a period to use; on the other hand, an excessive gap is unsightly and may result in body leakage.

Heretofore, gaps of the type mentioned above have been visually inspected with the aid of a linear scale which inspection personnel would attempt to position perpendicular to the axis of the gap. In some cases, a plurality of shim gauges or cylindrical plug gauges of varying size would be used for measuring the gap width, the gap width being estimated to be the dimension of the largest gauge which is insertable into the gap. These methods are not only time consuming and inaccurate, but can only be applied at certain selected points along the gap. Accordingly, there is a clear need in the art for an improved apparatus for gap measurement.

DISCLOSURE OF THE INVENTION

The present invention is directed to a gap gauge having an electronic output for measuring the width between opposing parts, such as neighboring automotive body panels and the like, which allows highly accurate measurements to be made quickly and inexpensively at all points along a gap. The gauge of the present invention is hand-held and may be easily inserted into the gap to provide an electrical display of the gap width.

The gauge includes a pair of reciprocable gauge fingers insertable into the gap and respectively shiftable away from each other into engagement with opposing surfaces of the parts by a lever which is pivotally mounted on a handle. One of the fingers is stationarily mounted on the handle while the other finger is secured to a plunger driven by the lever. Linear displacement of the plunger is translated by a rack and pinion to rotary motion for driving a potentiometer whose setting corresponds to the magnitude of the gap. A switch carried by the handle and activated by the lever enables the delivery of an electrical signal proportional to the potentiometer setting to a suitable electrical display device which provides a visual indication of the magnitude of the gap.

BRIEF DESCRIPTION OF THE DRAWINGS

In the drawings, which form an integral part of the specification and are to be read in conjunction therewith, and in which like components are designated by identical reference numerals in the various views:

FIG. 2 is a side elevational view of the gap gauge shown in FIG. 1;

BEST MODE FOR CARRYING OUT THE INVENTION

Figure 3:
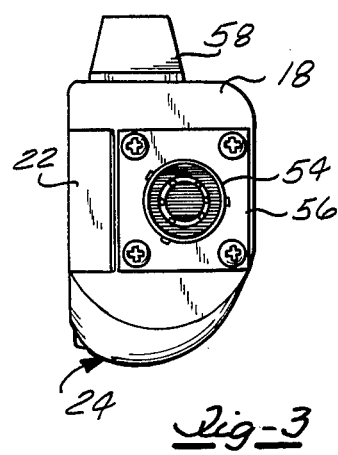
FIG. 3 is a view of the rear end of the gap gauge of FIG. 1.

Referring now to the drawings, the present invention is broadly concerned with a gap gauge, generally indicated by the numeral 10, which is adapted to measure the gap 12 between opposing surfaces of a pair of spaced apart parts, such as body and door panels 14 and 16 of a vehicle. Gap gauge 10 is adapted to be hand-held and produces an electrical signal which is delivered via line 60 to a suitable electronic display 65 for providing a visual indication of the magnitude of the gap 12.

Gauge 10 includes an elongate handle 18 of rigid material manufactured as by molding or casting, which is provided with a grip 24 along one side thereof that permits the handle 18 to be firmly grasped by a user. Handle 18 is provided with an essentially hollow interior 20 to which access may be gained through a longitudinally extending side plate 22 removably secured to the main portion of the handle 18 by screws 50.

A slot 61 in one side of the handle 18 opposite grip 24 communicates with the hollow interior 20. A rectangularly-shaped pivot block 62 pivotally mounted within the cutout 60 by a pivot pin 64 mounts the rear extremity of lever 58 for swinging movement toward and away from the handle 18. Lever 58 extends forwardly from the slot 61 to a point immediately adjacent the forward extremity of handle 18.

Figure 4:
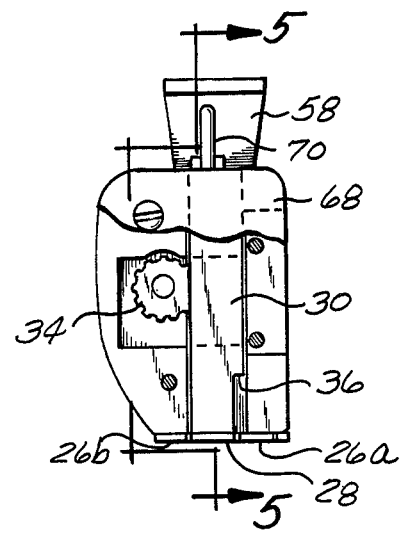
FIG. 4 is a view of the front end of the gap gauge of FIG. 1, parts of the cover plate being broken away for clarity; and, FIG. 5 is a sectional view taken along the line 5—5 in FIG. 4.
Figure 1:
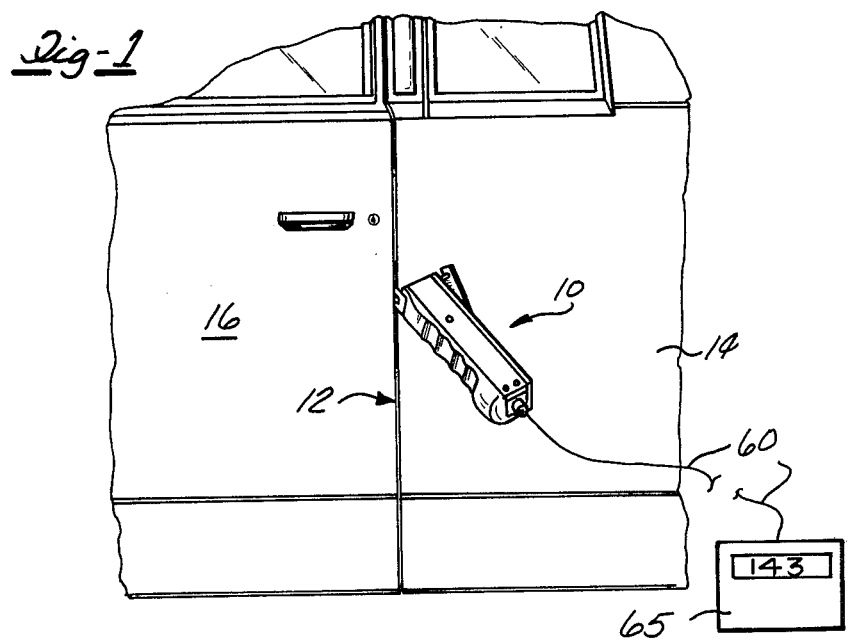
FIG. 1 is a perspective view of the gauge which forms the preferred embodiment of the present invention, depicted in an operative position for measuring the gap between a body and door panel of a vehicle.

A pair of elongate, planar, contact fingers 26a and 26b are mounted in transversely spaced apart relationship along the bottom side of handle 18 and extend forwardly beyond the forward extremity of handle 18. A rectangularly-shaped plunger 30 is slidably received within the hollow interior 20 of handle 18 and is captured between a channel 71 defined in the body 18 and a cover plate 68 which extends over the front end of the handle 18 and is secured thereto by screws or the like. Cover plate 68 defines the forward end of gauge 10 and extends substantially perpendicular to fingers 26a, 26b and 28 for reasons which will be discussed later. The lower extremity of plunger 30 is extendable through an opening in the bottom of handle 18 adjacent cover plate 68 and has secured thereto an elongate, planar, contact finger 28 which extends forwardly of cover plate 68 and is received between contact fingers 26a and 26b. A cutout in one corner of plunger 30 defines a shoulder 36 which registers with, and is adapted to engage, an edge of contact finger 26a, as best seen in FIG. 4. The distance between finger 26a and shoulder 36 defines the maximum degree of downward displacement of plunger 30. The maximum displacement of plunger 30, in turn, defines the maximum gap 12 which can be measured.

Plunger 30 includes a longitudinal bore 66 therein which extends to the upper end thereof. A compression spring 74 is captured within bore 66 and biases a pin 70 away from the plunger 30. Thus, it may be appreciated that depression of lever 58 forces the pin 70 against the spring 74, which in turn urges the plunger 30 to shift downwardly thereby spreading contact fingers 26 and 28. Bore 66 extends downwardly into plunger 30 by a distance $L_2$ which is greater than the maximum displacement of lever 58, designated by $L_1$. This arrangement provides for lost motion such that when opposing surfaces of the parts engage contact fingers 26 and 28 partially through the stroke of lever 58, lever 58 along with pin 70 continues traveling downwardly while plunger 30 remains stationary.

A toothed gear rack 32 is mounted on the rear side of plunger 30 and extends in a direction parallel to the displacement path of plunger 30. A pinion gear 34 meshingly engages rack 32 and is connected to the forward extremity of shaft 45. The forward end of shaft 45 is pivotally mounted by a bearing support 38 on the inner face of plate 22. The rear end of shaft 45 is connected by a coupling 44 to the input shaft of a rotary potentiometer 46 mounted on plate 22. A torsion spring 47 sleeved over shaft 45 has the opposite ends thereof respectively secured to shaft 45 and bracket 48 which supports potentiometer 46. Spring 47 biases shaft 45 (and thus pinion gear 34) to rotate in a counter-clockwise direction as viewed in FIG. 4, thereby biasing plunger 30 to return to its retracted position after lever 58 is released.

A switch 40 having a switch arm 42 is secured to plate 22 immediately beneath lever 48 and rearward of plunger 30. An actuator pin 72 is slidably confined within a bore in the handle 18, immediately above arm 42, such that depression of lever 58 forces pin 72 to contact and actuate arm 42, thus actuating switch 40. Switch 40 is coupled in a circuit with potentiometer 46 by electrical leads 52. Leads 52 are coupled with line 60 via an electrical connector 54 extending through a bore 57 and secured to the handle 58 by a mounting plate 56. The lengths of pins 70 and 72 are selected such that pin 72 actuates switch 40 immediately before lever 58 reaches its fully depressed position; consequently, the setting of potentiometer 46 produced by rotation of shaft 45 is not delivered on line 60 to the indicator 65 until fingers 26 and 28 have actually engaged opposing surfaces of panels 14 and 16. In this manner, the indicator displays only a single reading corresponding to the magnitude of the gap rather than a series of continuously changing readings (which may confuse the user and result in a false reading) as the lever 58 pivots to its fully depressed position.

In distinction to the arrangement described immediately above, switch 40 may alternatively be coupled in a circuit with indicator 65 in a manner to produce a strobe signal; in this alternate embodiment of the invention, the strobe signal from switch 40 is employed to enable the indicator 65 (or any other suitable data recorder) at the point at which gap data is to be taken or displayed. Finally, the gap gauge 10 may be effectively used without inclusion of switch 40, in which case the variable output of potentiometer 46 is continuously displayed by indicator 65.

In use, fingers 26 and 28, which are normally coplanar before lever 58 is depressed, are inserted into the gap 12 until the outer face of cover plate 68 engages panels 14 and 16. It can be appreciated that since cover plate 68 is disposed perpendicular to the plane of the gap 12, fingers 26a, 26b and 28 extend coplanar with such gap plane; in this manner, the fingers 26a, 26b and 28 are automatically aligned within the gap 12 to insure valid gap readings. Lever 58 is then depressed causing plunger 30 to extend until fingers 26 and 28 engage the opposing surfaces of panels 14 and 16; thereafter, plunger 30 remains stationary while lever 58 forces pin 70 downwardly into the bore 66 against the biasing influence of spring 74.

The outward linear displacement of plunger 30 is translated to rotational motion of shaft 45 through rack 32 and pinion gear 34. The angular displacement of shaft 45, which corresponds to the spacing between fingers 26 and 28, sets potentiometer 46. Immediately before lever 58 reaches its fully actuated position, switch 40 is activated and the setting of potentiometer 46 is transmitted via line 60 to the indicator 65.

INDUSTRIAL APPLICABILITY

It can be readily appreciated that the gap gauge of the present invention may be employed for measuring the distances between a wide variety of parts. Although the gap gauge is well adapted for manual use, such gauge may also be used with automated equipment as well; for example, automated mechanical devices may be employed to direct the fingers 26 and 28 into the gap as well as to depress the lever 58.

The length and geometry of contact fingers 26 and 28 may be varied to suit particular applications of the gauge.

From the foregoing, it is apparent that the gap gauge described above not only provides for the reliable accomplishment of the objects of the invention, but does so in a particularly simple and reliable manner. It is recognized, of course, that those skilled in the art may make various modifications or additions to the preferred embodiment chosen to illustrate the invention wihtout departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. Apparatus for measuring the gap between opposed surfaces of a pair of spaced apart parts, comprising:
   first and second means insertable into said gap for respectively contacting said opposed surfaces;
   means for mounting said first and second contacting means for reciprocable movement toward and away from each other;
   means coupled with said mounting means for displacing said first and second contacting means in a direction away from each other and respectively into engagement with said opposed surfaces; and,
   means for sensing the relative displacement between said first and second contacting means, including means for producing an electrical signal corresponding to the magnitude of said gap, said first contacting means including a pair of finger members, and said second contacting means including one finger member, said pair of finger members being spaced apart and defining a space therebetween within which said one finger member may be received.

2. Apparatus for measuring the gap between opposed surfaces of a pair of spaced apart parts, comprising:
   first and second means insertable into said gap for respectively contacting said opposed surfaces;
   means for mounting said first and second contacting means for reciprocable movement toward and away from each other;

means coupled with said mounting means for displacing said first and second contacting means in a direction away from each other and respectively into engagement with said opposed surfaces; and, means for sensing the relative displacement between said first and second contacting means, including means for producing an electrical signal corresponding to the magnitude of said gap, said mounting means including a handle having said first contacting means thereon, a plunger slidably mounted on said handle and wherein said second contacting means is secured to said plunger.

3. The apparatus of claim 2, wherein said displacing means includes a manually engageable, shiftable member mounted on said handle and means for transmitting force from said shiftable member to said plunger.

4. The apparatus of claim 3, including means for producing lost motion between said second contacting means and said shiftable member whereby said shiftable member may continue to shift after said first and second contacting means have respectively engaged said opposed surfaces.

5. The apparatus of claim 4, wherein:
said shiftable member includes a lever pivotally connected on said handle,
said force transmitting means includes a pin engaging said lever,
said lost motion means includes a bore in said plunger slidably receiving said pin, and
said displacing means includes means biasing said plunger away from said lever.

6. Apparatus for measuring the gap between opposed surfaces of a pair of spaced apart parts, comprising:
first and second means insertable into said gap for respectively contacting said opposed surfaces;
means for mounting said first and second contacting means for reciprocable movement toward and away from each other;
means coupled with said mounting means for displacing said first and second contacting means in a direction away from each other and respectively into engagement with said opposed surfaces; and,
means for sensing the relative displacement between said first and second contacting means, including means for producing an electrical signal corresponding to the magnitude of said gap, said sensing means including switch means selectively actuatable by said displacing means for producing an electrical control signal indicative that said first and second contacting means have engaged said opposed surfaces.

7. Apparatus for measuring the gap between opposed surfaces of a pair of spaced apart parts, comprising:
a manually manipulable handle;
a pair of elongate members for respectively contacting said opposed surfaces;
means for mounting at least one of said elongate members for reciprocating movement on said handle;
manually operable actuating means shiftably mounted on said handle for driving said mounting means, said actuating means being shiftable from a standby position in which the spacing between said elongate members is less in magnitude than the spacing between said opposed surfaces and an operated position in which said elongate members respectively engage said opposed surfaces;

means responsive to said actuating means only after said members have contacted said opposed surfaces for developing an indication of the magnitude of said gap; and lost motion means for allowing said actuating means to continue to shift toward said actuated position thereof after said elongate members have engaged said opposed surfaces.

8. The apparatus of claim 7, wherein said actuating means includes a lever pivotally mounted on said handle.

9. Apparatus for measuring the gap between opposed surfaces of a pair of spaced apart parts, comprising:
a manually manipulable handle;
a pair of elongate members for respectively contacting said opposed surfaces;
means for mounting at least one of said elongate members for reciprocating movement on said handle;
manually operable actuating means shiftably mounted on said handle for driving said mounting means, said actuating means being shiftable from a standby position in which the spacing between said elongate members is less in magnitude than the spacing between said opposed surfaces and an operated position in which said elongate members respectively engage said opposed surfaces; and,
means responsive to said actuating means only after said members have contacted said opposed surfaces for developing an indication of the magnitude of said gap,
one of said elongate members in said pair thereof including first and second spaced apart portions, the other of said elongate members being receivable between said first and second portions.

10. Apparatus for measuring the gap between opposed surfaces of a pair of spaced apart parts, comprising:
a manually manipulable handle;
a pair of elongate members for respectively contacting said opposed surfaces;
means for mounting at least one of said elongate members for reciprocating movement on said handle;
manually operable actuating means shiftably mounted on said handle for driving said mounting means, said actuating means being shiftable from a standby position in which the spacing between said elongate members is less in magnitude than the spacing between said opposed surfaces and an operated position in which said elongate members respectively engage said opposed surfaces;
means responsive to said actuating means only after said members have contacted said opposed surfaces for developing an indication of the magnitude of said gap; and
means on said handle responsive to reciprocation of said one elongate member for producing an electrical signal corresponding to the magnitude of said gap,
said means for developing an indication including means responsive to said signal for visually displaying said gap magnitude,
said developing means including a switch electrically coupled with said producing means for enabling the delivery of said signal from said producing means to said displaying means.

11. Apparatus for measuring the gap between opposed surfaces of a pair of spaced apart parts, comprising:
   first and second means insertable into said gap for respectively contacting said opposed surfaces;
   a body;
   a plunger reciprocably mounted on said body and having one of said first and second contacting means coupled therewith;
   a shaft rotatably mounted on said body;
   means shiftably mounted on said body for reciprocating said plunger;
   means coupled to said shaft for producing an electrical signal corresponding to the relative displacement between said first and second contacting means; and
   gear means for coupling said plunger in driving relationship to said shaft, including a first gear member mounted on said plunger and reciprocable therewith and a second gear member meshingly engaging said first gear member and mounted on said shaft for rotation therewith.

12. The apparatus of claim 11, wherein:
   the other of said first and second contacting means is mounted on said body,
   said first gear member includes a toothed rack, and
   said second gear member includes a toothed pinion.

13. The apparatus of claim 11, wherein said reciprocating means includes:
   a handle on said body, and
   a drive pin disposed in force transmitting relationship between said handle and said plunger.

14. Apparatus for measuring the gap between opposed surfaces of a pair of spaced apart parts, comprising:
   a body;
   first and second means insertable into said gap for respectively contacting said opposed surfaces;
   means for mounting said first and second contacting means on said body for movement toward and away from each other;
   shiftable means on said body for displacing said first and second contacting means away from each other and respectively into contact with said opposed surfaces upon shifting movement of said shiftable means;
   means carried by said body for producing lost motion between one of said first and second contacting means and said shiftable means whereby to allow the latter to continue shifting after said first and second contacting means having engaged said opposed surfaces; and
   means carried by said body for sensing the relative displacement between said first and second contacting means.

15. The apparatus of claim 14 wherein:
   said mounting means includes a mounting element reciprocably mounted on said body and having one of said first and second contacting members secured thereto,
   said shiftable means includes a lever pivotally mounted on said body, and a drive member drivingly coupling said lever with said mounting element, and
   said lost motion means includes an opening in said mounting element for selectively receiving said drive member therein.

16. The apparatus of claim 14, wherein said mounting means includes means for engaging said body upon displacement of said first and second contacting means to limit the displacement of said first and second contacting means.

* * * * *